UNITED STATES PATENT OFFICE 2,457,048

PROCESS OF MAKING TERTIARY AMINES

Lucas P. Kyrides and Ferdinand B. Zienty, St. Louis, Mo., assignors to Monsanto Chemical Company, St. Louis, Mo., a corporation of Delaware No Drawing. Application October 4, 1946, Serial No. 701,078

10 Claims. (Cl. 260—329)

This invention relates to a novel improvement in the preparation of tertiary amines and more particularly to tertiary amines of the formula

in which $R_1$ is a radical selected from the group consisting of aryl-methyl and thienyl-methyl radicals, and $R_2$ is a radical selected from the group consisting of aryl, alkyl, cycloalkyl, aryl-methyl, and thienyl-methyl radicals.

On treating a secondary amine of the formula type:

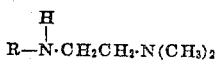

in which R represents a radical of the type hereinbefore described as $R_1$ or $R_2$ with a compound of the type $R' \cdot X$ in which $R'$ is a radical of the type defined hereinabove as $R_1$, and X is chlorine or bromine, large amounts of a quaternary salt were formed and substantially none of the desired tertiary amine was formed. The use of low temperature and dilute solutions did not avoid formation of large amounts of quaternary salt. When the secondary amine is one having the formula:

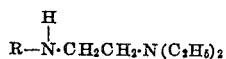

the yield of the desired tertiary amine is satisfactory. The problem thus described appears to be specific for the secondary amine in which the N' substituents are methyl radicals. Moreover, when the dihydrochloride or other di-salt of a secondary amine having the formula:

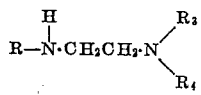

in which $R_3$ and $R_4$ are alkyl groups, is heated with the halide of the formula $R' \cdot X$, substantially none of the desired tertiary amine is formed.

According to the present invention, generally stated, a monobasic salt of a secondary amine of the formula:

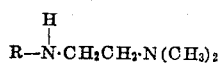

in which R represents a radical selected from the group consisting of $R_1$ and $R_2$, $R_1$ being defined as a group of radicals consisting of aryl-methyl and thienyl-methyl radicals, and $R_2$ being defined as a group of radicals consisting of aryl, alkyl, cycloalkyl, aryl-methyl, and thienyl-methyl radicals, is heated in an organic solvent such as benzene with an organic halide of the formula $R' \cdot X$, in which $R'$ is one of the radicals $R_1$ and X is bromine or chlorine. The mixture is heated, for example, at 65-70° C. until the reaction resulting in the formation of the desired tertiary amine is completed, for example, in approximately 4 to 6 hours. The tertiary amine is recovered, for example, as a salt, from the reaction mixture by any desired procedure, for example, by rendering the reaction mixture alkaline with sodium hydroxide solution, recovering the amine base which separates, dissolving the amine in an organic solvent such as ether or a mixture of carbon tetrachloride and acetone and treating the solution thus formed with dry hydrogen chloride gas in amount sufficient to form the monohydrochloride or dihydrochloride of the tertiary amine. The tertiary amine salt may be purified, for example, by recrystallization from acetone containing approximately 4% of water.

Any desired method of preparing the monobasic salt of the secondary amine hereinabove described may be employed. For example, the monohydrochloride can be prepared by treating a benzene solution of the said secondary amine with a benzene solution of hydrogen chloride in amount sufficient to form the monohydrochloride of the secondary amine. Another method of preparing the monohydrochloride is to heat one mole of the secondary amine in an organic solvent such as benzene, acetone, or alcohol, with one mole of an ammonium salt of a mineral acid such as ammonium chloride, ammonium bromide, ammonium sulfate, or ammonium nitrate, and a small quantity of water until evolution of ammonia ceases. The monobasic salt of the secondary amine may be utilized in the solvent medium in which it is prepared for the purpose of preparing the tertiary amines of the present invention. As an alternative, the monobasic salt of the secondary amine may be recovered from the reaction mixture after the evolution of ammonia has ceased, by evaporating the reaction mixture to dryness. The dry material may be recrystallized from a suitable solvent or mixture of solvents if desired. Similarly, the acid sulfate of the secondary amine can be prepared from one mole of the secondary amine and ½ mole of ammonium sulfate. A further method of preparing the monohydrochloride is to treat one mole of the secondary amine with one mole of aqueous hydrochloric acid, followed by evaporation to dryness. Other salts, such as the monohydrobromide, monobasic phosphate, monobasic nitrate, or monobasic salt of any of the mineral acids, can be prepared by the above procedures as well as by other methods known to those skilled in the art.

Suitable aryl-methyl radicals for the purpose of the present invention may include, for example, the benzyl radical, substituted benzyl radicals such as para-isopropyl-benzyl (cumenyl), dimethoxy-benzyl (veratryl) and para-chlorobenzyl radicals. Suitable thienyl-methyl radicals for the purpose of the present invention are the thenyl radical and substituted thenyl radicals such as the 5-chloro-thenyl, 5-bromo-thenyl, and 5-methyl-thenyl radicals and other substituted thenyl radicals containing methyl groups substituted in the 4 and 5 positions of the thiophene residue.

Suitable radicals for the $R_2$ position in the preparation by the method of the present invention of the tertiary amines hereinbefore described are the phenyl radical, substituted phenyl radicals such as the chlorophenyl radicals, the toluene radical, the xylenyl radical, and the alkoxy-phenyl radical; alkyl radicals such as the methyl, ethyl, propyl, isopropyl, and butyl radicals; cycloalkyl radicals such as the cyclopropyl, cyclobutyl, cyclopentyl, and cyclohexyl radicals; the biphenyl radical, substituted biphenyl radicals, the alpha or beta-naphthyl radicals, the alpha or beta methyl naphthyl radicals, the benzyl radical and substituted benzyl radicals such as the cumenyl and para-chlorobenzyl radicals.

Suitable organic solvents for use in the process of the present invention are benzene, toluene, xylene, petroleum ether, dioxane, acetone, alcohol, methanol, and butanol. The equivalent ratio of monobasic salt of the secondary amine to organic halide may range from 1:1 to 4:1 or even higher. The temperature of the reaction is not particularly critical and may range, for example, from 0° C. or lower, to 20–110° C. or even higher, depending upon the conditions selected for the reaction.

The following examples will serve to illustrate the novel process of the present invention:

*Example I*

To a solution of 26.6 grams (0.162 mole) of N-phenyl-N',N'-dimethyl-ethylenediamine in 100 cc. of benzene were added 8.7 grams (0.162 mole) of ammonium chloride and 0.5 cc. of water. The mixture was refluxed for 10 hours during which time ammonia was evolved. The resulting mixture was cooled to 30° C., a solution of 10.7 grams (0.181 mole) of 2-thenyl chloride in 35 cc. benzene was added and the resulting mixture was heated at 65–70° C. for 5½ hours. Thereafter, 40 grams of 50% sodium hydroxide solution and 40 cc. of water was added. The mixture was stirred vigorously at 55–60° C. for 1 hour. The benzene layer was then separated and distilled. There was recovered 7.0 grams of N-phenyl-N(2-thenyl)-N',N'-dimethyl-ethylenediamine in the form of a yellow oil, boiling point 185–188° C./8 mm. The oil was dissolved in a 3 to 1 mixture of carbon tetrachloride and acetone. To the solution was added sufficient dry hydrogen chloride to form the monohydrochloride of the tertiary amine. On recrystallization from acetone containing 4% water, the monohydrochloride melted at 183–184° C. (corrected).

In the procedure of the present example, the monohydrochloride of N-phenyl-N',N'-dimethyl ethylenediamine may be recovered if desired from the reaction mixture after the evolution of ammonia has ceased by evaporating the reaction mixture to dryness. If desired, the monohydrochloride may be purified by recrystallization. In place of ammonium chloride in the above procedure, any ammonium salt of a mineral acid, such as the sulphate, nitrate, or bromide, may be used.

*Example II*

The procedure described in Example I was repeated, using 0.162 mole of N-phenyl-N',N'-dimethyl-ethylenediamine and 0.162 mole of 2-thenyl chloride. Excellent yields of N-phenyl-N-(2-thenyl)-N',N'-dimethyl-ethylenediamine were obtained.

*Example III*

To a solution of 16.4 grams (0.10 mole) of the free base, N-phenyl-N',N'-dimethyl-ethylenediamine, in 25 cc. of butanol held at 45–50° C., there was slowly added a solution of 6.6 grams (0.05 mole) of 2-thenyl chloride in 25 cc. of benzene. The mixture was heated at 70° C. for one hour, treated with 15 cc. of water and 5 grams of 50% sodium hydroxide solution and stirred vigorously. The benzene-butanol layer was separated and fractionated. There was recovered 9.4 grams of unchanged N-phenyl-N',N'-dimethyl-ethylenediamine. A large amount of non-volatile residue, a quaternary salt, remained in the still. None of the desired tertiary amine was obtained.

When the procedure of Example III was repeated using considerably greater dilutions, for example, 4 to 5 times the amount of butanol, and a temperature of 25° C., a large amount of quaternary salt was obtained, and substantially only a trace of the desired tertiary amine was formed.

*Example IV*

To a solution of 19.2 grams (0.10 mole) of the free base, N-phenyl-N',N'-diethyl-ethylenediamine, in 100 cc. of butanol at 25° C. there was added slowly a solution of 6.6 grams (0.05 mole) of 2-thenyl chloride in 65 cc. of benzene. The mixture was agitated at 25° C. for 19 hours, treated with water and excess alkali, and the benzene-butanol layer was separated and fractionated. There was obtained 9.0 grams unreacted N-phenyl-N',N'-diethyl-ethylenediamine and 9.0 grams of the tertiary amine, N-phenyl-N-(2-thenyl)-N',N' - diethyl-ethylenediamine, boiling point 143–145° C./1–1.5 mm.

The tertiary amine base, dissolved in a 3 to 1 mixture of carbon tetrachloride and acetone, was treated with dry hydrogen chloride gas. The dihydrochloride which precipitated was recrystallized from acetone containing a small amount of water. Melting point 144–146° C. (corrected).

This example illustrates the facility with which the tertiary amine is obtained when groups higher than methyl are present in the $R_3$ and $R_4$ positions of the secondary amine described hereinbefore.

*Example V*

To a solution of 8.2 grams (0.05 mole) of the free base, N-phenyl-N',N'-dimethyl-ethylenediamine, in 40 cc. of benzene there was added a solution of 3.2 grams (0.025 mole) of benzyl chloride in 10 cc. of benzene. The mixture was refluxed for 20 minutes, when the reaction was stopped because of separation of an insoluble quaternary salt on the walls of the reactor. The mixture was alkalinized strongly with aqueous sodium hydroxide solution, the quaternary salt separating as an oil insoluble in both the aqueous and benzene layers. On distillation of the benzene layer, only unchanged N-phenyl-N',N'-dimethyl-ethylenediamine was recovered and none of the desired tertiary amine was obtained.

*Example VI*

To a solution of 9.5 grams (0.058 mole) of N-phenyl-N',N'-dimethyl-ethylenediamine in 5 cc. of 95% ethanol was added 3.1 grams (0.058 mole) of ammonium chloride. The mixture was refluxed for one hour during which time ammonia was evolved. The mixture was cooled to 30° C. and a solution of 3.67 grams (0.029 mole) of benzyl chloride in 10 cc. of ethanol was added and the resulting mixture was heated at 65–70° C. for 8 hours. Thereafter, 15 cc. of concentrated hydrochloric acid was added and the mixture was extracted with benzene to remove unreacted benzyl chloride. The mixture was treated with 20 cc. of water, alkalinized with 50% sodium hydroxide solution and stirred vigorously at 55–60° C. The benzene layer was then separated and fractionated. There was recovered 5.3 grams of N-benzyl - N - phenyl - N',N' - dimethyl - ethylenediamine, boiling point 179–180° C./7 mm. The monohydrochloride was prepared by treating a benzene solution of the base with dry hydrogen chloride gas. The solid salt was filtered off, dried and recrystallized from ethanol. Melting point 210–211° C. (corrected).

*Example VII*

The mono-acid phosphate of N-ethyl-N',N'-dimethyl ethylenediamine was prepared by adding 19.6 grams (0.1 mole) of phosphoric acid to a solution of 34.8 grams (0.3 mole) of N-ethyl-N',N'-dimethyl-ethylenediamine in approximately 100 cc. of butanol. To the resulting solution of the mono-acid phosphate was added a solution of 19.1 grams (0.15 mole) of benzyl chloride and the reaction mixture was heated at 65–70° C. for approximately 6 hours. Thereafter, the reaction mixture was rendered alkaline with aqueous sodium hydroxide solution and the oily layer which separated was N-benzyl-N-ethyl-N',N'-dimethyl-ethylenediamine.

*Example VIII*

The mono-acid sulfate of N-cyclohexyl-N',N'-dimethyl-ethylenediamine was prepared by adding 9.8 grams (0.1 mole) of sulfuric acid to a solution of 51 grams (0.3 mole) of N-cyclohexyl-N',N'-dimethyl-ethylenediamine in approximately 100 cc. of acetone. To the resulting solution of the mono-acid sulfate was added a solution of 19.1 grams (0.15 mole) of benzyl chloride and the reaction mixture was heated at 40° C. for approximately 8 hours. Thereafter, the reaction mixture was rendered alkaline with sodium hydroxide solution and the oil which separated was N - benzyl - N - cyclohexyl - N',N' - dimethyl-ethylenediamine. The disulphate salt of the free base tertiary amine was prepared by adding sulfuric acid to a solution of the free base tertiary amine in toluene.

We claim:
1. In the process of making a tertiary amine of the formula:

in which $R_1$ is a radical selected from the group consisting of aryl-methyl and thienyl-methyl radicals and $R_2$ is a radical selected from the group consisting of aryl, alkyl, cycloalkyl, aryl-methyl and thienyl-methyl radicals, the step comprising reacting in an organic solvent a mixture of a monobasic salt of a secondary amine of the formula:

in which R is a radical selected from the group consisting of $R_1$ and $R_2$ radicals as hereinbefore defined with an organic halide of the formula:

in which R' is a radical selected from the group consisting of $R_1$ radicals as hereinbefore defined.

2. In the process of making a tertiary amine of the formula:

in which $R_1$ is a radical selected from the group consisting of aryl-methyl and thienyl-methyl radicals and $R_2$ is a radical selected from the group consisting of aryl, alkyl, cycloalkyl, aryl-methyl and thienyl-methyl radicals, the step comprising heating in an organic solvent a mixture of a monobasic salt of a secondary amine of the formula:

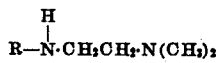

in which R is a radical selected from the group consisting of $R_1$ and $R_2$ radicals as hereinbefore defined with an organic halide of the formula:

in which R' is a radical selected from the group consisting of $R_1$ radicals as hereinbefore defined.

3. In the process of making a tertiary amine of the formula:

in which $R_1$ is a radical selected from the group consisting of aryl-methyl and thienyl-methyl radicals and $R_2$ is a radical selected from the group consisting of aryl, alkyl, cycloalkyl, aryl-methyl and thienyl-methyl radicals, the steps comprising reacting in an organic solvent a mixture of 1–4 equivalents of a monobasic salt of a secondary amine of the formula:

in which R is a radical selected from the group consisting of $R_1$ and $R_2$ radicals as hereinbefore defined with one equivalent of an organic halide of the formula:

in which R' is a radical selected from the group consisting of $R_1$ radicals as hereinbefore defined.

4. In the process of making a tertiary amine of the formula:

in which $R_1$ is a radical selected from the group consisting of aryl-methyl and thienyl-methyl radicals and $R_2$ is a radical selected from the group consisting of aryl, alkyl, cycloalkyl, aryl-methyl and thienyl-methyl radicals, the step comprising combining at a temperature in the range of 0–110° C. in an organic solvent 1–4 equivalents of a monobasic salt of a secondary amine of the formula:

$$R-\underset{H}{N}-CH_2CH_2\cdot N(CH_3)_2$$

in which R is a radical selected from the group consisting of $R_1$ and $R_2$ radicals as hereinbefore defined with one equivalent of an organic halide of the formula:

$$R'\cdot X$$

in which R' is a radical selected from the group consisting of $R_1$ radicals as hereinbefore defined.

5. In the process of making a tertiary amine of the formula:

$$R_1-\underset{R_2}{N}-CH_2CH_2\cdot N(CH_3)_2$$

in which $R_1$ is a radical selected from the group consisting of aryl-methyl and thienyl-methyl radicals and $R_2$ is a radical selected from the group consisting of aryl, alkyl, cycloalkyl, arylmethyl and thienyl-methyl radicals, the step comprising combining at a temperature in the range of 20-110° C. in an organic solvent 1-4 equivalents of a monobasic salt of a secondary amine of the formula:

$$R-\underset{H}{N}-CH_2CH_2\cdot N(CH_3)_2$$

in which R is a radical selected from the group consisting of $R_1$ and $R_2$ radicals as hereinbefore defined with one equivalent of an organic halide of the formula:

$$R'\cdot X$$

in which R' is a radical selected from the group consisting of $R_1$ radicals as hereinbefore defined.

6. In the process of making N-thenyl-N-phenyl-N',N'-dimethyl-ethylenediamine, the step comprising heating in an organic solvent a monobasic salt of N-phenyl-N',N'-dimethyl-ethylenediamine with thenyl chloride.

7. In the process of making N-benzyl-N-phenyl-N',N'-dimethyl-ethylenediamine the step comprising heating in an organic solvent a mixture of a monobasic salt of N-phenyl-N',N'-dimethyl-ethylenediamine and benzyl chloride.

8. In the process of making N-thenyl-N-phenyl-N',N'-dimethyl-ethylenediamine the step comprising heating in an organic solvent the monohydrochloride of N-phenyl-N',N'-dimethyl-ethylenediamine with thenyl chloride.

9. In the process of making N-benzyl-N-phenyl-N',N'-dimethyl-ethylenediamine the step comprising heating in an organic solvent a mixture of the monohydrochloride of N-phenyl-N',-N'-dimethyl-ethylenediamine and benzyl chloride.

10. The process of making a tertiary amine of the formula:

$$R_1-\underset{R_2}{N}-CH_2CH_2\cdot N(CH_3)_2$$

in which $R_1$ is a radical selected from the group consisting of aryl-methyl and thienyl-methyl radicals and $R_2$ is a radical selected from the group consisting of aryl, alkyl, cycloalkyl, arylmethyl, and thienyl-methyl radicals, comprising heating in an organic solvent a mixture of ammonium chloride, a small quantity of water, and a secondary amine of the formula:

$$R-\underset{H}{N}-CH_2CH_2\cdot N(CH_3)_2$$

in which R is a radical selected from the group consisting of $R_1$ and $R_2$ radicals as hereinbefore defined, adding an organic halide of the formula $R'\cdot X$, R' being a radical of the group $R_1$ as hereinbefore defined, heating the resulting mixture and subsequently recovering the tertiary amine from the reaction mixture.

LUCAS P. KYRIDES.
FERDINAND B. ZIENTY.

REFERENCES CITED

The following references are of record in the file of this patent:

UNITED STATES PATENTS

| Number | Name | Date |
| --- | --- | --- |
| 2,406,594 | Djerassi | Aug. 27, 1946 |

Disclaimer 2,457,048.—*Lucas P. Kyrides* and *Ferdinand B. Zienty*, St. Louis, Mo. PROCESS OF MAKING TERTIARY AMINES. Patent dated December 21, 1948. Disclaimer filed May 5, 1950, by the assignee, *Monsanto Chemical Company*.
Hereby enters this disclaimer to claim 9 of said patent.
[*Official Gazette May 30, 1950.*]

Disclaimer 2,457,048.—*Lucas P. Kyrides* and *Ferdinand B. Zienty*, St. Louis, Mo. PROCESS OF MAKING TERTIARY AMINES. Patent dated December 21, 1948. Disclaimer filed May 5, 1950, by the assignee, *Monsanto Chemical Company*.

Hereby enters this disclaimer to claim 9 of said patent.

[*Official Gazette May 30, 1950.*]